Nov. 11, 1952     K. J. NAHOOM     2,617,573
SUN VISOR ATTACHABLE RECEPTACLE
Filed Nov. 14, 1949
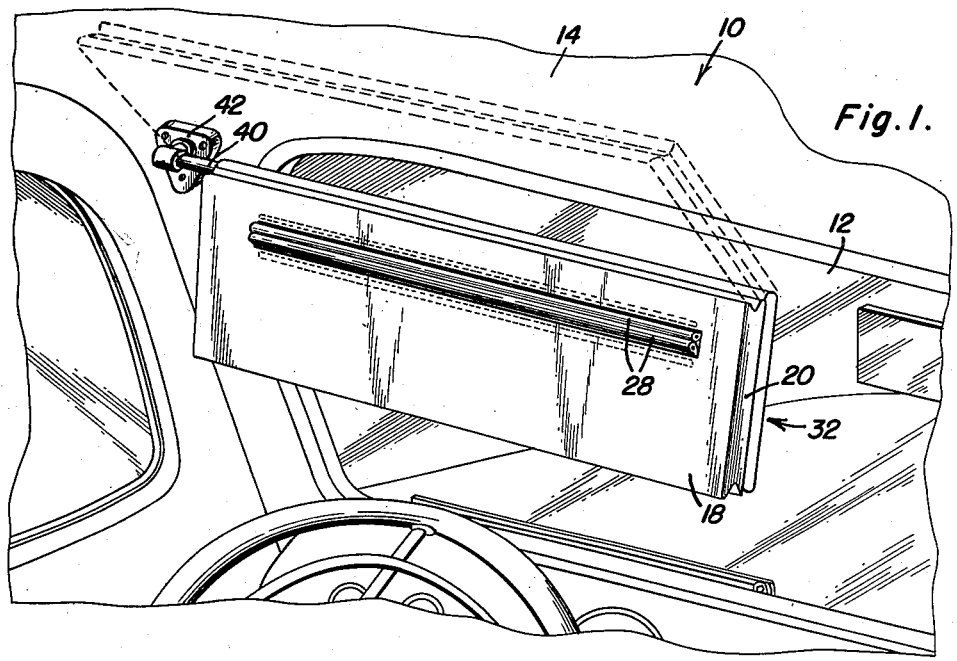
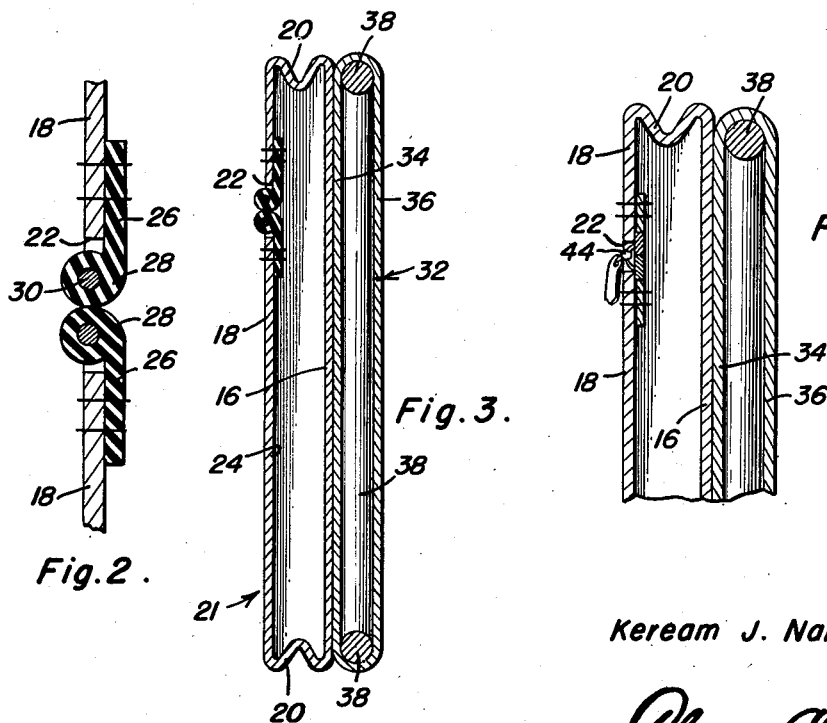
Inventor
Kereram J. Nahoom Patented Nov. 11, 1952

2,617,573

UNITED STATES PATENT OFFICE 2,617,573

SUN VISOR ATTACHABLE RECEPTACLE

Keream J. Nahoom, St. Petersburg, Fla.

Application November 14, 1949, Serial No. 127,007

2 Claims. (Cl. 224—42.42)

This invention relates to automobile sun visors, and more particularly to a sun-visor incorporated with an expansible case.

The primary object of this invention is to provide a case for storing maps and other papers or articles and which also serves as a sun visor.

Another important object of this invention is to provide a case in conformity with the foregoing object that may be pivotally secured to the interior of an automobile to serve as a sun visor, and which will be expansible to receive a large quantity of material therein.

Another important object is to provide a case, in accordance with the foregoing objects, in which articles may be readily placed or removed from, and which when swung to the inoperative position as a sun visor safely retains its contents therein, and appears to be nothing more than a sun visor as a safeguard against larceny.

A meritorious feature of the present invention resides in the provision of a case having expansible sidewalls for large carrying capacity and the positioning of the opening in the case which make the contents thereof easily accessible despite the high position of a sun visor in an automobile relative to a passenger therein.

A final feature to be specifically enumerated herein resides in the opening to the case being disposed in the front wall thereof and the means provided for normally closing the opening.

These, together with various ancillary features and objects of the invention which will later become apparent as the following description proceeds, are attained by the present invention, a preferred embodiment of which has been illustrated by way of example only in the accompanying drawings, wherein:

Figure 1 is a perspective view of the present invention showing the same attached to the interior of an automobile and in the operative position as a sun visor, the alternative inoperative position of the combined sun visor and case being shown in dotted outline;

Figure 2 is a vertical sectional detail view of the means provided for closing the case shown in Figure 1;

Figure 3 is a vertical transverse sectional view of the present invention;

Figure 4 is a fragmentary vertical sectional view of the present invention illustrating a modification in a means provided for closing the opening in the case.

Reference is now made more specifically to the accompanying drawings wherein like numerals designate similar parts throughout the various views, and in which the numeral 10 indicates generally the driver's compartment of a conventional automobile that conveniently includes a windshield 12 and a ceiling 14.

The subject matter of this invention comprises a rear wall 16 and a front wall 18, the peripheries of which are connected by bellows-type sidewalls 20 thereby defining an expansible case 21. The front, rear, and sidewalls are preferably formed of a flexible material such as leather, Leatherette, or suitable plastic. A longitudinal slot 22 is provided in the front wall 18 that is downwardly spaced from the upper edge thereof, and which communicates with the interior 24 of the case 21.

In the modification shown in Figures 1, 2 and 3 a pair of resilient strips 26, of rubber or the like, are secured to the inner side of the front wall 18 on opposite sides of the slot 22 and have beads 28 thereon, which abut in the slot 22. In the preferred construction the beads 28 are provided with suitable stiffening members 30 to insure the beads 28 being retained in a slot 22 closing position.

Indicated generally by the numeral 32 is a conventional automobile sun visor, which customarily includes front and rear walls 34 and 36 respectively which are positioned on a rectangular wire frame 38 having a laterally extending rod 40 extending therefrom. The rod 40 is pivotally received in a bracket 42 mounted upon the automobile ceiling 14. The rear wall 16 is suitably secured to the wall 34 as by glue or stitching, whereby the case 21 swings with sun visor 32 with the latter stiffening and reinforcing the rear wall 16.

As will be understood, the sun visor 32 may be of any conventional type, however, it will be noted that in the visor 32 illustrated, the walls 16 and 34 may be replaced by a single wall, or if found to reduce manufacturing costs the frame 38, may be directly secured to the periphery of the wall 16 and the walls 34 and 36 dispensed with entirely. In other words the case 21 may be formed as an attachment for conventional visors in existence, or formed as complete unit as suggested.

The modification shown in Figure 4 differs from that shown in 1, 2, and 3 only in that a different means, namely, a slide fastener 44 is provided for closing the slot 22 as will be readily understood.

The present invention provides several advantages over similar devices of this character heretofore in use. The case 21 is expansible to retain a sizeable quantity of material, but will collapse to negligible thickness when only a few articles are contained therein. The opening to the case 21 being disposed downwardly from the upper edge thereof permits articles to be more easily placed in or removed from the case 21. The means provided for closing the slot or opening 22 lends a neat appearance to the present invention and is, of course, disposed in such a position as to not be readily discernible when the sun visor is in the inoperative position, whereby the case 21 may be utilized as a receptacle for valuable papers as its nature is not apparent.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A utility case comprising a rear wall and a flexible front wall, flexible, bellows-type side walls connecting all the peripheral edges of the rear wall to all the peripheral edges of the front wall, said front wall having an elongated slot therethrough, a pair of elongated, juxtaposed resilient beads disposed in the slot elongated stiffening members disposed centrally within said beads, oppositely extending mounting strips on said beads, and means securing the strips to the front wall on opposite sides of the slot.

2. A utility case comprising a rear wall and a flexible front wall, flexible, bellows-type side walls connecting all the peripheral edges of the rear wall to all the peripheral edges of the front wall, said front wall having an elongated slot therethrough, a pair of elongated, juxtaposed resilient beads disposed in the slot elongated stiffening members disposed centrally within said beads, oppositely extending mounting strips on said beads, and means securing the strips to the front wall on opposite sides of the slot, said strips being laterally offset from said beads with the central axes of the beads being co-planar with the front wall.

KEREAM J. NAHOOM.

REFERENCES CITED

The following references are of record in the file of this patent:

UNITED STATES PATENTS

| Number | Name | Date |
|---|---|---|
| D. 159,753 | Pelton | Aug. 15, 1950 |
| 1,199,979 | Garst | Oct. 3, 1916 |
| 1,527,056 | Martin | Feb. 17, 1925 |
| 1,710,582 | Lifton | Apr. 23, 1929 |
| 2,013,706 | Wiesenfeld et al. | Sept. 10, 1935 |
| 2,091,835 | Reiter | Aug. 31, 1937 |
| 2,107,216 | Rogers | Feb. 1, 1938 |
| 2,123,454 | Doppelt | July 12, 1938 |
| 2,148,557 | Hook | Feb. 28, 1939 |
| 2,201,197 | Minor, Jr. | May 21, 1940 |
| 2,211,879 | Cave | Aug. 20, 1940 |
| 2,278,011 | Murdock | Mar. 31, 1942 |
| 2,278,271 | Laitman | Mar. 31, 1942 |
| 2,287,581 | Walker | June 23, 1942 |
| 2,432,674 | Office | Dec. 16, 1947 |
| 2,474,495 | Pollak | June 28, 1949 |
| 2,474,784 | Golden | June 28, 1949 |